United States Patent [19]
Sakakiyama

[11] Patent Number: 4,660,699
[45] Date of Patent: Apr. 28, 1987

[54] SYSTEM FOR CONTROLLING THE CLUTCH TORQUE OF AN ELECTROMAGNETIC CLUTCH FOR VEHICLES

[75] Inventor: Ryuzo Sakakiyama, Tokyo, Japan

[73] Assignee: Fuji Jukogyo Kabushiki Kaisha, Tokyo, Japan

[21] Appl. No.: 685,283

[22] Filed: Dec. 24, 1984

[30] Foreign Application Priority Data

Dec. 27, 1983 [JP] Japan ............ 58-251024

[51] Int. Cl.[4] ............ F16D 27/16; F16D 37/02; B60K 41/02

[52] U.S. Cl. ............ 192/0.075; 192/0.096; 192/21.5

[58] Field of Search ............ 192/0.033, 0.075, 0.076, 192/0.096, 21.5, 103 R

[56] References Cited

U.S. PATENT DOCUMENTS

| | | | |
|---|---|---|---|
| 3,581,156 | 5/1971 | Meudon et al. | 192/103 R X |
| 4,377,223 | 3/1983 | Sakakiyama et al. | 192/103 R X |
| 4,425,992 | 1/1984 | Makita | 192/0.076 X |
| 4,449,620 | 5/1984 | Sakakiyama | 192/0.076 X |
| 4,461,374 | 7/1984 | Umezawa | 192/21.5 |
| 4,502,579 | 3/1985 | Makita | 192/0.076 |

FOREIGN PATENT DOCUMENTS

| | | | |
|---|---|---|---|
| 0015024 | 1/1982 | Japan | 192/0.033 |
| 0030624 | 2/1982 | Japan . | |
| 2081412 | 2/1982 | United Kingdom | 192/0.076 |

*Primary Examiner*—Rodney H. Bonck
*Assistant Examiner*—Richard M. Lorence
*Attorney, Agent, or Firm*—Martin A. Farber

[57] ABSTRACT

A system for controlling the clutch torque of an electromagnetic clutch for a vehicle having an accelerator pedal switch for producing an output signal when an accelerator pedal of the vehicle is depressed. A clutch current circuit including a transistor is provided for controlling the clutch current passing through a coil of the electromagnetic clutch. A logic gate circuit is provided responsive to the output signal of the accelerator pedal switch for controlling the transistor so as to decrease the clutch current to a low value and thereafter to gradually increase the current to a rated value.

6 Claims, 4 Drawing Figures

OSCILLATOR
TRIANGULAR GENERATOR
START-CONTROL CIRCUIT
TRANSMISSION

SYSTEM FOR CONTROLLING THE CLUTCH TORQUE OF AN ELECTROMAGNETIC CLUTCH FOR VEHICLES

BACKGROUND OF THE INVENTION

The present invention relates to a system for controlling the clutch torque of an electromagnetic clutch disposed between an engine and a transmission of a motor vehicle, and more particularly to a system for controlling the variation of the clutch torque from a low clutch torque while an accelerator pedal is released to a high clutch torque upon depressing the pedal.

Japanese Patent Application Laid-open No. 57-30624 discloses a clutch control system in which clutch torque is maintained at a value larger than engine torque by a rated current as long as the vehicle is driven faster than a predetermined speed, irrespective of the condition of the accelerator pedal. In this system, when the accelerator pedal is released, irregular and abrupt fluctuation in engine torque occurs which is transmitted to a driving system, unpleasant shocking the driver. Further, because a large amount of rated current is needed to be supplied to the clutch under the lower engine speed condition while the accelerator pedal is being released, the electric power comsumption by a battery is great.

In order to remove such drawbacks, a control system was provided to absorb the torque variation. In the system, as shown in FIG. 4, the clutch torque is lowered to such a low value $T_1$ as long as the engine braking can be effected while the accelerator pedal is released, although the clutch torque during the depression of accelerator pedal is fixed to a rated high value $T_2$, as is in the conventional art.

On the other hand, when the accelerator pedal is depressed, the clutch torque rises from $T_1$ to $T_2$. However, since the rising speed of the clutch torque is higher than that of engine torque, the electromagnetic clutch fully engages before the engine torque reaches a sufficient value to drive the vehicle. Accordingly, engine speed can not be rapidly raised because of the sudden increase of load caused by rapid engagement of the clutch. As a result, vehicle speed decreases temporarily and stumbling of the vehicle occurs at the worst. In addition, the rapid engagement of the clutch causes a shock in the power transmission system.

SUMMARY OF THE INVENTION

The object of the present invention is to provide a clutch torque control system for an electromagnetic clutch which may quickly increase the engine speed in accordance with the depression of an accelerator pedal and reduce the shock in the transmission system by gradually engaging the clutch during depression of the accelerator pedal.

According to the present invention, there is provided a system for controlling the clutch torque of an electromagnetic clutch for a vehicle having an accelerator pedal for accelerating an engine to drive the vehicle. The system comprises an accelerator switch for producing an output signal when the accelerator pedal is depressed, a first circuit including a switching means for controlling the clutch current passing through a coil of the electromagnetic clutch, and a second circuit responsive to the output signal of the accelerator switch for controlling the switching means so as to decrease the clutch current to a low value and thereafter to gradually increase the current to a rated value.

In an aspect of the present invention, the switching means is a transistor provided in the circuit for the clutch current, and the second comprises a logic gate circuit and a pulse train generating circuit responsive to the output signal of the accelerator switch for producing a pulse train controlled by the logic gate circuit, the duty ratio of the pulse train gradually varying so as to gradually increase the clutch current.

The other objects and features of this invention will be apparently understood from the following description with reference to the accompanying drawings.

DETAILED DESCRIPTION OF THE PREFERRED EMBODIMENT

Figure 1:
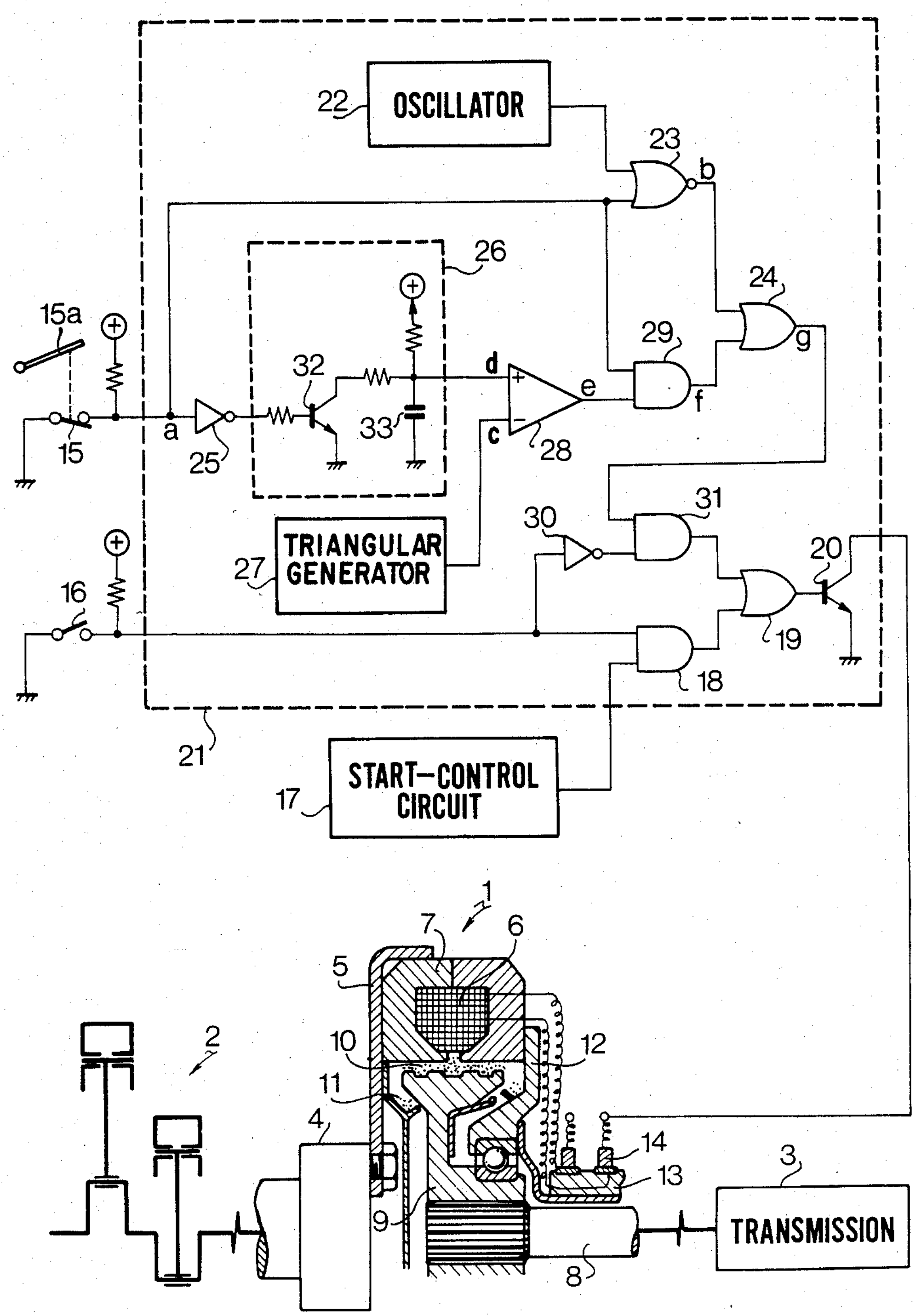
FIG. 1 is a schematic diagram showing an embodiment of the present invention.

Referring to FIG. 1, an electromagnetic powder clutch 1 is provided for transmitting power of an engine 2 to wheels (not shown) of a vehicle through a manual or belt-drive infinitely variable transmission 3. The electromagnetic powder clutch 1 comprises a drive member 7 connected to a crankshaft 4 of the engine 2 through a drive plate 5, a coil 6 provided in the drive member 7, a driven member 9 having its outer periphery spaced from the inner periphery of the drive member 7 by a gap 10, and a powder chamber 11 defined between the drive member 7 and driven member 9. The powder chamber 11 is provided with magnetic powder. The driven member 9 is secured to an input shaft 8 of the belt-drive infinitely variable transmission 3. A holder 12 secured to the drive member 7 carries slip rings 13 which are electrically connected to the coil 6. The coil 6 is supplied through brushes 14 and slip rings 13 with a clutch current from a control unit 21.

When the magnetizing coil 6 is excited by the clutch current, the drive member 7 is magnetized to produce a magnetic flux passing through the driven member 9. The magnetic powder is aggregated in the gap 10 by the magnetic flux and the driven member 9 is engaged with the drive member 7 by the powder. On the other hand, when the clutch current is cut off, the drive and driven members 7 and 9 are disengaged from one another. The transmission ratio of the belt-drive infinitely variable transmission 3 is determined in dependency on the engine speed and the vehicle speed. When the vehicle speed is lower than a predetermined low value, the transmission ratio is at the highest ratio. When the engine speed is at high value, the transmission ratio becomes low.

An accelerator pedal switch 15 for detecting the depression of an accelerator pedal 15*a* is turned off to produce a high level output when the pedal 15*a* is depressed, and is turned on to produce a low level output when the pedal is released. A vehicle speed switch 16 is provided and turned on to produce a low level output when the vehicle speed exceeds a predetermined level. The vehicle speed switch 16 and a start-control circuit 17 are connected to an AND gate 18 in the control unit 21, the output of which is applied to a driving transistor 20 through an OR gate 19 to control the clutch current passing through the clutch coil 6. The output of the accelerator pedal switch 15 is connected to a NOR gate 23, AND gate 29 and to a reference voltage generator 26 through an inverter 25. A triangular generator 27 and the output of the reference voltage generator 26 are connected to inputs of a comparator 28, the output e of which is connected to the AND gate 29. The NOR gate 23 is applied with a rectangular wave pulse train from an oscillator 22. The outputs b and f of the NOR gate 23 and AND gate 29 are applied to an OR gate 24, the output g of which is applied to an AND gate 31. The output of the vehicle speed switch 16 is applied to the AND gate 31 through an inverter 30. The output of AND gate 31 is connected to the other input of the OR gate 19.

The reference voltage generator 26 comprises a transistor 32 which is turned on and off in response to the signal a from the accelerator switch 15. When the accelerator pedal is released, the switch 15 is turned on, so that the transistor 32 is turned on in response to the high level signal from the inverter 25. Thus, the reference voltage is set to a low value by the discharging of a capacitor 33. When the transistor 32 is turned off, the reference voltage elevates gradually with charging of the capacitor 33 and reaches a high value which is higher than a peak voltage of the triangular pulses from the triangular generator 27.

Figure 2:
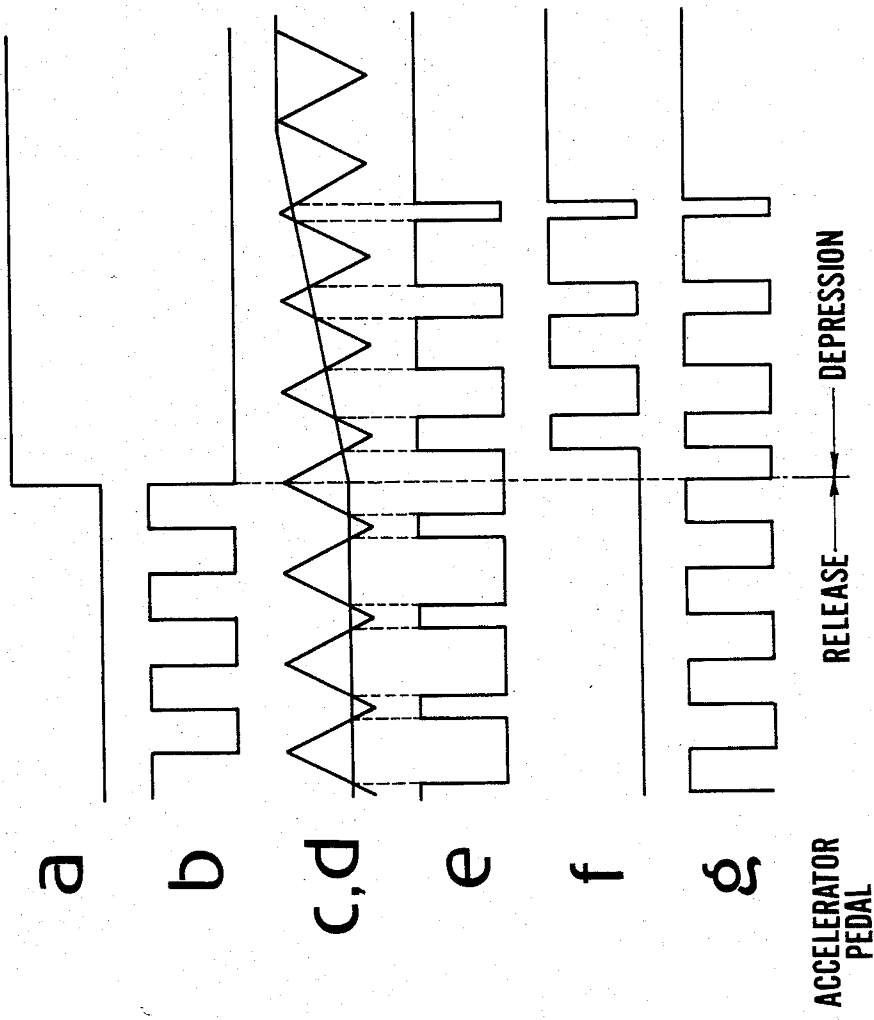
FIGS. 2(*a*) and (*e*) show waveforms of outputs at various portions of FIG. 1.

The operation of the clutch torque control system is explained hereinafter with reference to FIGS. 1 and 2. At starting of the vehicle, the output of the vehicle speed switch 16 is at a high level. Accordingly, a signal from the start control circuit 17 is applied to the transistor 20 through the AND gate 18 and the OR gate 19, so that the clutch current is controlled by the signal from the start control circuit so as to perform a smooth start of the vehicle with an increase of the engine speed. When the vehicle speed exceeds a predetermined value, the vehicle speed switch 16 is closed, so that the output of the switch 16 changes to a low level. Thus, the AND gate 18 is closed to cut off the signal from the start control circuit 17. In this situation, if the accelerator pedal 15*a* is released, the output of the accelerator switch 15 is at a low level as shown in FIG. 2(*a*). Accordingly, the AND gate 29 is closed and the NOR gate 23 produces a pulse train (b) as shown in FIG. 2(*b*). The pulses b are fed to the transistor 20 through the OR gate 24, AND gate 31 and OR gate 19. Thus, clutch current dependent on the duty ratio of the pulse train (b) flows in the clutch coil 6, producing a low clutch torque $T_1$ as shown by a line $l_1$ in FIG. 3.

Accordingly, the consumption of electric power is decreased and fluctuation of torque of the engine can be absorbed.

When the accelerator pedal 15*a* is depressed, the level of the output from the accelerator switch 15 goes to a high level as shown in FIG. 2(*a*), so that the output of the NOR gate 23 becomes low. Therefore, only the output of the comparator 28 is applied to the transistor 20 through the AND gate 29, OR gate 24, AND gate 31 and OR gate 19. The comparator 28 compares a triangular wave pulse train (c) with the reference voltage (d) to produce a rectangular pulse train (e). The duty ratio of the pulse train (e) increases with an increase of the reference voltage (d) as shown in FIGS. 2(*e*) and (*f*). At the beginning of the depression of the accelerator pedal 15, the duty ratio is very small, so that the clutch torque decreases to a very small value of the torque shown by a line $l_2$ in FIG. 3, which is smaller than one-third of a lock-up torque $T_2$. Accordingly, the load on the engine is very small, so that the engine speed quickly increases in accordance with the depression of the accelerator pedal.

Figure 3:
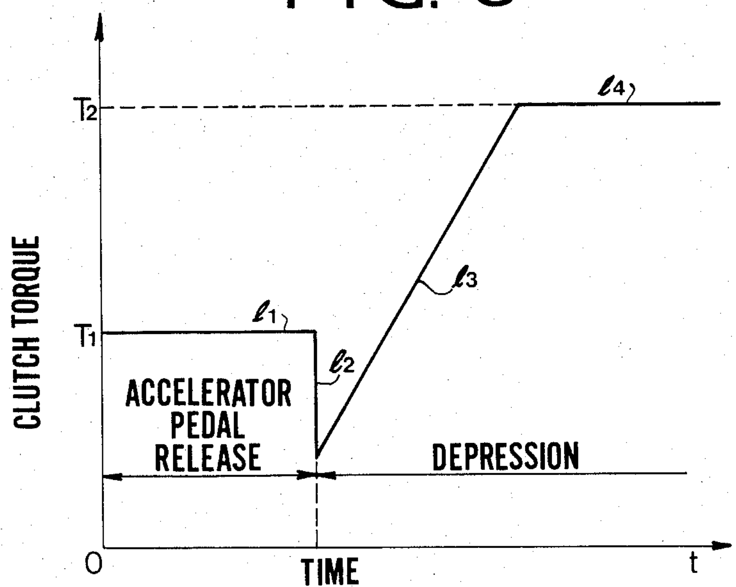
FIG. 3 is a graph showing clutch torque in the system of the present invention.
Figure 4:
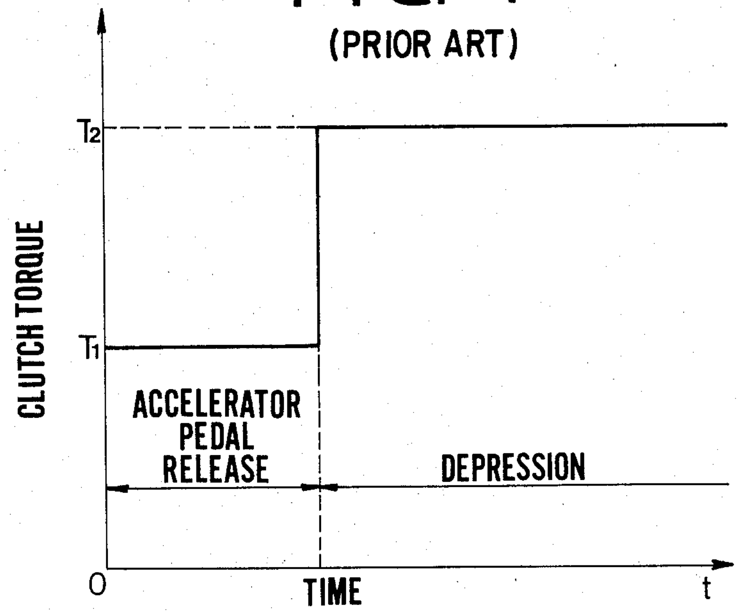
FIG. 4 is a graph showing clutch torque in a conventional system.

Thereafter, the clutch torque gradually increases as shown by a line $l_3$ in FIG. 3, as the duty ratio of clutch current gradually increases. The duty ratio reaches "1" with rated current flow. Thus, the rated clutch torque (lock-up torque) $T_2$ is provided as shown by a line $l_4$. Thus, the clutch is fully engaged to drive the vehicle. The above-described operation can also be carried out by a micro-computer system.

From the foregoing, it will be understood that the present invention provides a system which enables quick increase of the engine speed upon depression of the accelerator pedal and absorption of shock caused by abrupt engagement of the clutch.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling clutch torque for an electromagnetic clutch for a vehicle having an accelerator pedal for accelerating an engine to drive the vehicle, comprising accelerator switch means for producing a first signal of one logic level when the acelerator pedal is released and for producing a second signal of another logic level when the accelerator pedal is depressed, switching means for controlling clutch current passing through a coil of the electromagnetic clutch so as to control clutch torque thereof, first means responsive to the first signal of the accelerator switch means for producing a first control signal for controlling the switching means so as to decrease the clutch torque to a first low value greater than zero, second means responsive to the second signal for producing a second control signal which controls the switching means so as to decrease the clutch torque to a second low value lower than the first low value, and thereafter to gradually increase the clutch torque to a rated value.

2. The system according to claim 6 wherein the switching means is a transistor in a circuit for the clutch current.

3. The system according to claim 1, wherein said first means comprises oscillator means for producing pulses and a first logic gate circuit responsive to the first signal for passing the pulses so as to control said switching means, and said second means comprises a second logic gate circuit and a pulse train generating circuit responsive to said second signal of the accelerator switch means for producing a pulse train controlled by the second logic gate circuit, and the pulse train generating circuit is such that the duty ratio of the pulse train gradually varies so as to gradually increase the clutch current.

4. The system according to claim 3 wherein said pulse train generating circuit comprises a triangular generator means for producing a triangular wave pulse train, a reference voltage generator means having an output voltage which varies gradually, and comparator means for comparing the triangular wave pulse train with the reference voltage and for producing said pulse train as a rectangular pulse train.

5. The system according to claim 4 wherein, said second logic gate circuit includes a gate, vehicle speed switch means for producing and sending an output signal to said gate when vehicle speed exceeds a predetermined value, the output signal for allowing the rectangular pulse train to pass through said gate so as to control said switching means.

6. A system for controlling clutch torque for an electromagnetic clutch for a vehicle having an accelerator pedal for accelerating an engine to drive the vehicle, the clutch being operatively connected to the engine and a transmission of the vehicle comprising first means for controlling clutch current passing through a coil of the electromagnetic clutch so as to control clutch torque thereof, and second means for controlling the first means so as to decrease the clutch torque to a first low value greater than zero when the accelerator pedal is released and for controlling the first means so as to decrease the clutch torque to a second low value lower than the first low value when the accelerator pedal is depressed, and thereafter to gradually increase the clutch torque to a rated value.

* * * * *